United States Patent [19]
Smith et al.

[11] Patent Number: 5,638,173
[45] Date of Patent: Jun. 10, 1997

[54] SPECTRUM SPLITTING SPECTROSCOPIC APPARATUS

[75] Inventors: Brian J. E. Smith, Bristol; David N. Batchelder; Kurt J. Baldwin, both of Leeds, all of United Kingdom

[73] Assignee: Renishaw PLC, Gloucestershire, United Kingdom

[21] Appl. No.: 578,651

[22] PCT Filed: May 24, 1995

[86] PCT No.: PCT/GB95/01190

§ 371 Date: Jan. 16, 1996

§ 102(e) Date: Jan. 16, 1996

[87] PCT Pub. No.: WO95/32408

PCT Pub. Date: Nov. 30, 1995

[30] Foreign Application Priority Data

May 24, 1994 [GB] United Kingdom ............... 9410395

[51] Int. Cl.$^6$ ............... G01J 3/44; G01J 3/18; G01J 3/28
[52] U.S. Cl. ............... 356/301; 356/328
[58] Field of Search ............... 356/301, 302, 356/303, 305, 326, 328, 331, 332, 333, 334

[56] References Cited

U.S. PATENT DOCUMENTS

| | | | |
|---|---|---|---|
| 2,453,164 | 11/1948 | Swings | 356/305 |
| 3,733,131 | 5/1973 | Mould . | |
| 3,791,737 | 2/1974 | Johannsson | 356/331 |
| 4,599,001 | 7/1986 | Richard | 356/419 |
| 4,729,658 | 3/1988 | Poultney | 356/328 |
| 4,747,688 | 5/1988 | Geary | 356/345 |
| 5,424,826 | 6/1995 | Kinney | 356/326 |
| 5,442,439 | 8/1995 | Battey et al. | 356/326 |

FOREIGN PATENT DOCUMENTS

| | | |
|---|---|---|
| 571401 | 2/1962 | Belgium ............... 356/305 |
| 543 578 | 5/1993 | European Pat. Off. . |
| 42 23 212 | 1/1994 | Germany . |
| 2 256 923 | 12/1992 | United Kingdom . |
| WO89/00280 | 1/1989 | WIPO . |
| WO92/17806 | 10/1992 | WIPO . |
| WO93/21548 | 10/1993 | WIPO . |

OTHER PUBLICATIONS

Synopsis of "White Light Interferometry", C. Lin and R.F. Sullivan, An Application of White Light Interferometry in Thin Film Measurement, IBM J. Res. Develop., pp. 269-276, (May, 1976).

Denton et al., *Charge-Injection and Charge-Coupled Devices in Practical Chemical Analysis*, vol. 2, 1983, American Chemical Society, pp. 133-154.

Patent Abstracts of Japan, vol. 6, No. 203 (P-148)[1081], Oct. 14, 1982, "*Spectrum Measuring Device*".

Laser Focus World, Design and Applications, "*Holographic Raman spectrometer makes process monitoring feasible*", 3 pages. Oct. 1993.

Kaiser Optical Systems, Inc., *Raman Spectrometers*, 8 pages undated.

*Primary Examiner*—F. L. Evans
*Attorney, Agent, or Firm*—Oliff & Berridge

[57] ABSTRACT

In a Raman spectrometer having a charge-coupled device (CCD) detector (24), an incoming beam (36) containing a spectrum of Raman scattered light is dispersed by a diffraction grating (44). Different parts of the spectrum are split into separate optical paths (48A-C) by edge filters (38A, 38B) and a mirror (46). These components are tilted at different vertical angles, so that after the beams (48A-C) have been dispersed by the diffraction grating (44), they form partial spectra (50A-C), one above the other on the CCD (24). This enables several consecutive parts of a widely dispersed spectrum to be viewed simultaneously on the CCD (24) at high resolution.

14 Claims, 6 Drawing Sheets

5,638,173

SPECTRUM SPLITTING SPECTROSCOPIC APPARATUS

This invention relates to spectroscopic apparatus and methods. It is particularly useful in Raman spectroscopy, though it can equally be used in other forms of spectroscopy.

The Raman effect is a phenomenon in which a sample scatters incident light of a given frequency, into a frequency spectrum which has lines caused by interaction of the incident light with the molecules making up the sample. Different molecular species have different characteristic Raman spectra, and so the effect can be used to analyse the molecular species present.

A prior Raman analysis apparatus is described in our earlier European Patent Application No. EP 0543578. A sample is illuminated by a laser beam, and the resulting Raman scattered light is analysed, and then detected. The detector may be a charge-coupled device (CCD) comprising a two-dimensional array of pixels. The analysis of the Raman spectrum may be carried out by a dispersive device such as a diffraction grating, which disperses the spectrum produced from a point or line in the sample across the width of the CCD.

The apparatus may be arranged to disperse the spectrum widely across the CCD, to provide high spectral resolution. For a CCD of a given width, however, only a part of the spectrum can then be detected at any one time. To acquire data from a wider spectrum, one possible method is to expose one part of the spectrum onto the CCD for a sufficient time, and then to read all of the data relating to that part of the spectrum from the CCD into a computer. Next, the diffraction grating is indexed to a new rotary position, so that the next part of the spectrum is received by the CCD. Again, sufficient exposure time is allowed, and all the data from that part of the spectrum is read into the computer. This process is repeated as often as necessary. However, this step-and-repeat method has a disadvantage during subsequent computer processing of the data, because it can be difficult to join together in a seamless manner the separate blocks of data acquired from the separate parts of the spectrum. This is especially true if there have been changes in the background light level between the separate exposures, or if other conditions have altered. Furthermore, exposing the separate parts of the spectrum sequentially obviously increases the time required to analyse the complete spectrum, compared with a lower resolution system in which the whole spectrum of interest is dispersed more narrowly across the width of the CCD.

EP 0543578 describes a technique in which the CCD is scanned synchronously with rotation of the diffraction grating, to allow seamless acquisition of data from a widely dispersed spectrum. This technique overcomes the problem of joining together separate blocks of data with different background light levels, but still requires a similar length of time to analyse the full spectrum. Furthermore, both these methods require a precision rotary stage for mounting the diffraction grating, so that it can be rotated automatically into repeatable positions, preferably under computer control.

According to the present invention, there is provided spectroscopic analysis apparatus comprising:

an optical input for receiving a spectrum of scattered light produced from a sample;

a detector for the scattered light, extending in at least a first direction;

a dispersive device arranged between the optical input and the detector to disperse a part of said spectrum across the detector in said first direction; and at least one light splitter arranged between the optical input and the detector to split the scattered light to follow at least two different optical paths to the detector, the light reaching the detector by each of the optical paths being in different parts of said spectrum.

Preferred embodiments of the invention will now be described by way of example, with reference to the accompanying drawings, wherein.

Figure 1:
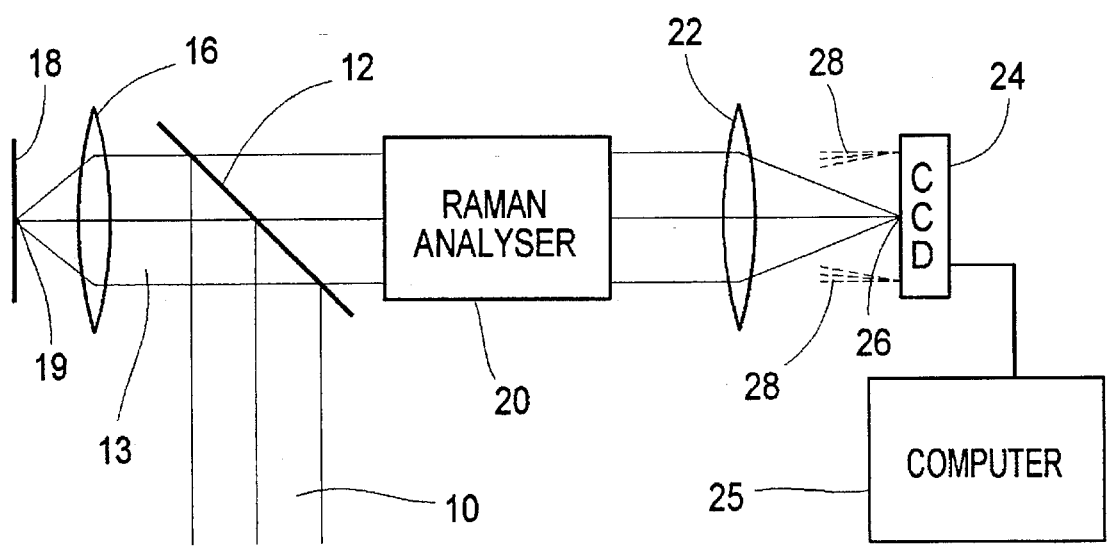
FIG. 1 is a schematic block diagram of a prior Raman analysis apparatus.

Referring to the drawings, the previously known arrangement shown in FIG. 1 has a dichroic filter 12 arranged at 45° to an incoming laser beam 10. The filter 12 reflects light of the wavelength of the laser beam 10 but transmits all other wavelengths. The laser beam 10 is thus reflected through 90° into an optical path 13, and is focused by a microscope objective lens 16 to a spot 19 on a sample 18. Light of various wavelengths scattered from the sample (e.g. as a result of Raman scattering) is collected by the lens 16 and passes back through the system. The dichroic filter 12 rejects reflected and Rayleigh scattered light at the same wavelength as the incoming laser beam, and transmits a spectrum of light which has been shifted to other wavelengths. This spectrum is analysed by an analyser 20, and focused by a lens 22 onto a detector such as a charge-coupled device (CCD) 24. The signals detected by the CCD 24 may then be acquired by a computer 25 for further processing.

As described in EP 0543578, the analyser 20 may be a dispersive device such as a diffraction grating, in which case a spectrum is dispersed across the width of the CCD 24, as indicated by broken lines 28. Furthermore, the 45° filter 12 may be replaced by a holographic filter at a low angle of incidence, e.g. 10°.

Figure 2:
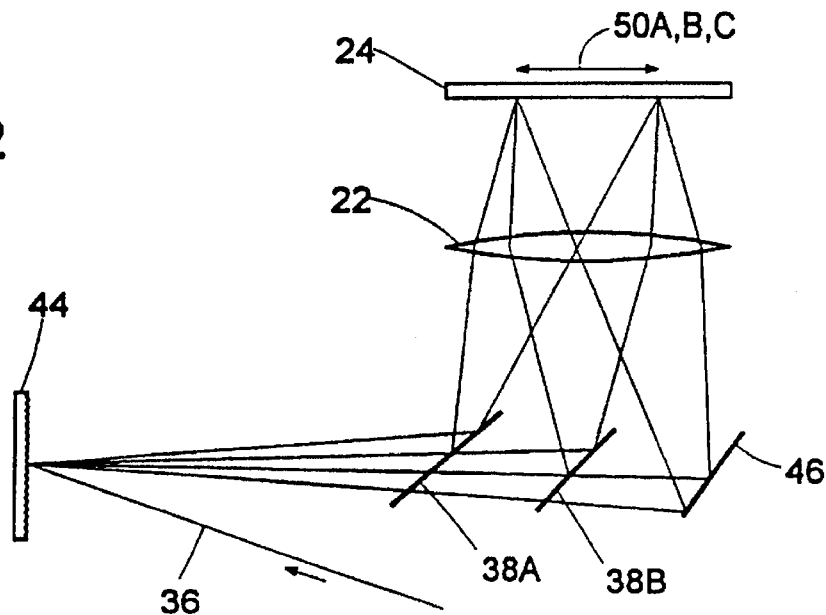
FIG. 2 is a schematic plan view of the analysing and detecting sections of a first embodiment of Raman analysis apparatus according to the invention.
Figure 3:
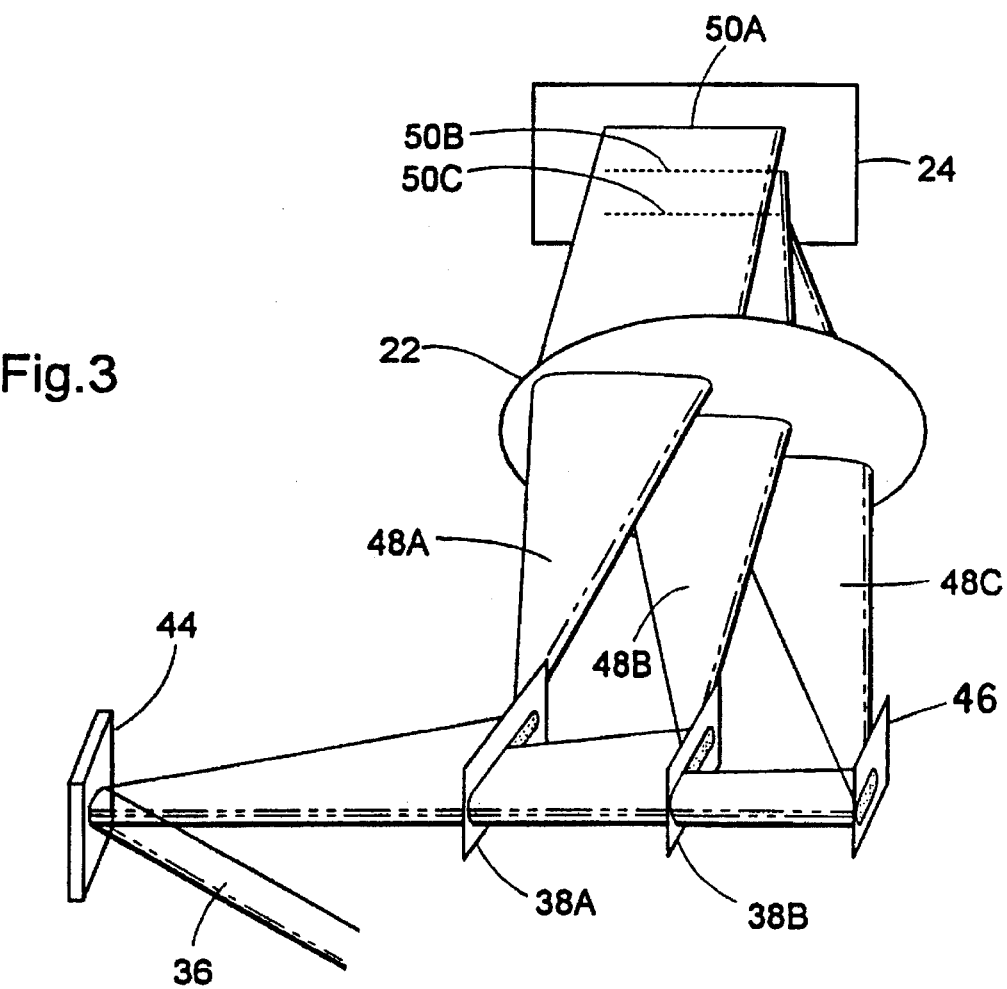
FIG. 3 is a schematic perspective view of the apparatus of FIG. 2.

FIGS. 2 and 3 illustrate a first embodiment of the invention. Only the analyser and detector parts of the system are shown. The optical components for illuminating the sample and collecting scattered light may be as shown in FIG. 1, or any other conventional arrangement. The system of FIGS. 2 and 3 uses a CCD 24 as a detector and a diffraction grating 44 which acts to disperse the Raman scattered light of an incoming beam 36 as a spectrum horizontally across the width of the CCD 24. To achieve good resolution, the grating 44 is arranged to disperse the spectrum of interest more widely than can be accommodated within the single width of the CCD 24.

Edge filters 38A,38B and a mirror 46 are arranged in the path of the dispersed spectrum, between the diffraction grating 44 and the lens 22 which focuses the spectrum onto the CCD 24. The first filter 38A passes the medium and low wavenumbers, but reflects higher wavenumbers as a dispersed beam 48A. This is focused by the lens 22 to produce a spectrum at 50A on the CCD 24.

The cut-off or edge of the edge filter 38B is arranged to be lower in wavenumbers than that of the filter 38A, so that light of the medium wavenumbers which has passed through the filter 38A is reflected by the filter 38B, as a beam 48B. The lens 22 focuses this beam onto the CCD as a spectrum 50B. Finally, light of the low wavenumbers which passes through both the filters 38A and 38B is reflected by the mirror 46 as a beam 48C, focused as a spectrum 50C on the CCD 24 by the lens 22.

The filters 38A,38B and the mirror 46 are all tilted to different horizontal angles (i.e. tilted about their vertical axes), such that the spectra 50A,50B,50C are reflected to the same horizontal location on the CCD 24. However, the filters 38A,38B and mirror 46 are each given a slightly different tilt in the vertical direction (i.e. about their horizontal axes) so that the spectra 50A,50B,50C are separated from each other in the vertical direction on the CCD 24, as best seen in FIG. 3. In this way, the whole spectrum of interest is focused simultaneously onto the CCD 24, in three separate parts, without loss of resolution. In practice, the data for the three parts of the spectrum is acquired from the CCD by the computer 25 (FIG. 1), where software joins together the data for the separate parts so as to display or print out the complete spectrum. Some spectral information may be lost at the joins, but this loss is minimal provided the cut-off edges of the filters are sharp. It is also possible for the joins between the individual spectra 50A,50B and between the spectra 50B,50C to overlap, ideally with sharp cut-off edges, but more gradual cut-off edges can be accommodated. The software can correct the resulting data from a look-up table, derived by pre-calibrating the instrument by dispersing a known spectrum with the grating 44.

The arrangement of FIGS. 2 and 3 has several advantages over prior art systems which rotate the grating 44 stepwise to disperse different parts of the spectrum across the CCD. First of all, the time required to acquire the data for the whole spectrum is reduced. There is also no need for the diffraction grating 44 to be mounted upon a precision rotatable stage, which as previously described would need to be indexed to carefully controlled positions. It is a significant advantage that the arrangement has no moving parts in use. Another advantage is that all the different parts of the spectrum 50A–50C are obtained simultaneously, under the same conditions, since this obviates the problems experienced with the previous method if conditions such as background light should change between the measurements on the different partial spectra.

Figure 4:
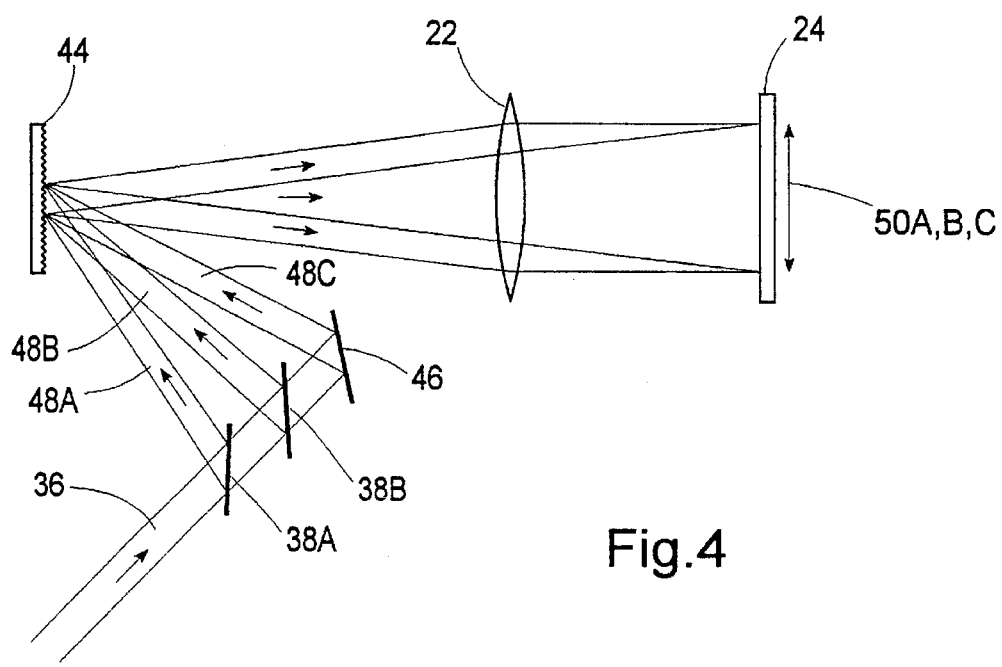
FIG. 4 is a schematic plan view of the analysing and detecting sections of a second embodiment of Raman analysis apparatus according to the invention.
Figure 5:
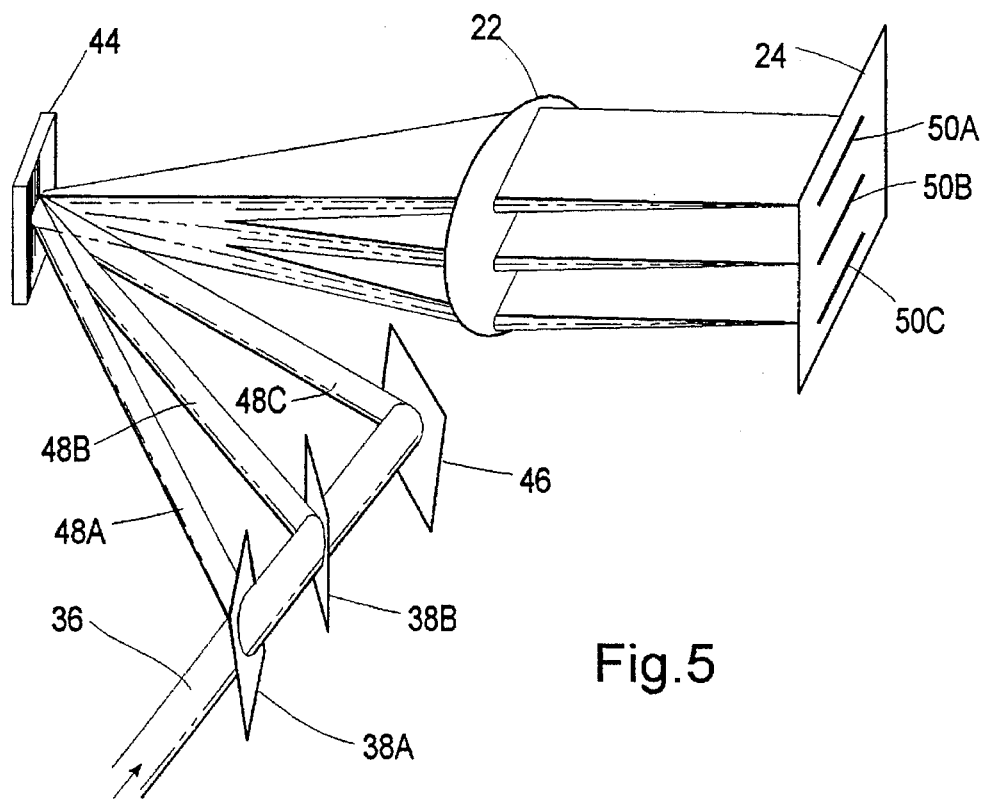
FIG. 5 is a schematic perspective view of the apparatus according to FIG. 4.

FIGS. 4 and 5 show an alternative to the arrangement of FIGS. 2 and 3. In this arrangement, the filters 38A,38B and the mirror 46 are arranged before the diffraction grating 44. As in FIGS. 2 and 3, they are tilted so as to split the incoming beam 36 into three parts having different wavenumber ranges, which are then dispersed by the diffraction grating 44 into three partial spectra 50A,50B,50C which appear vertically above each other on the CCD 24. This arrangement has an advantage over that of FIGS. 3 and 4, in that the physical sizes of the filters 38A,38B and of the lens 22 can be smaller and these components can therefore be cheaper and more easily realised. In particular, the aberrations caused by the lens 22 can be reduced in this arrangement.

Figure 6:
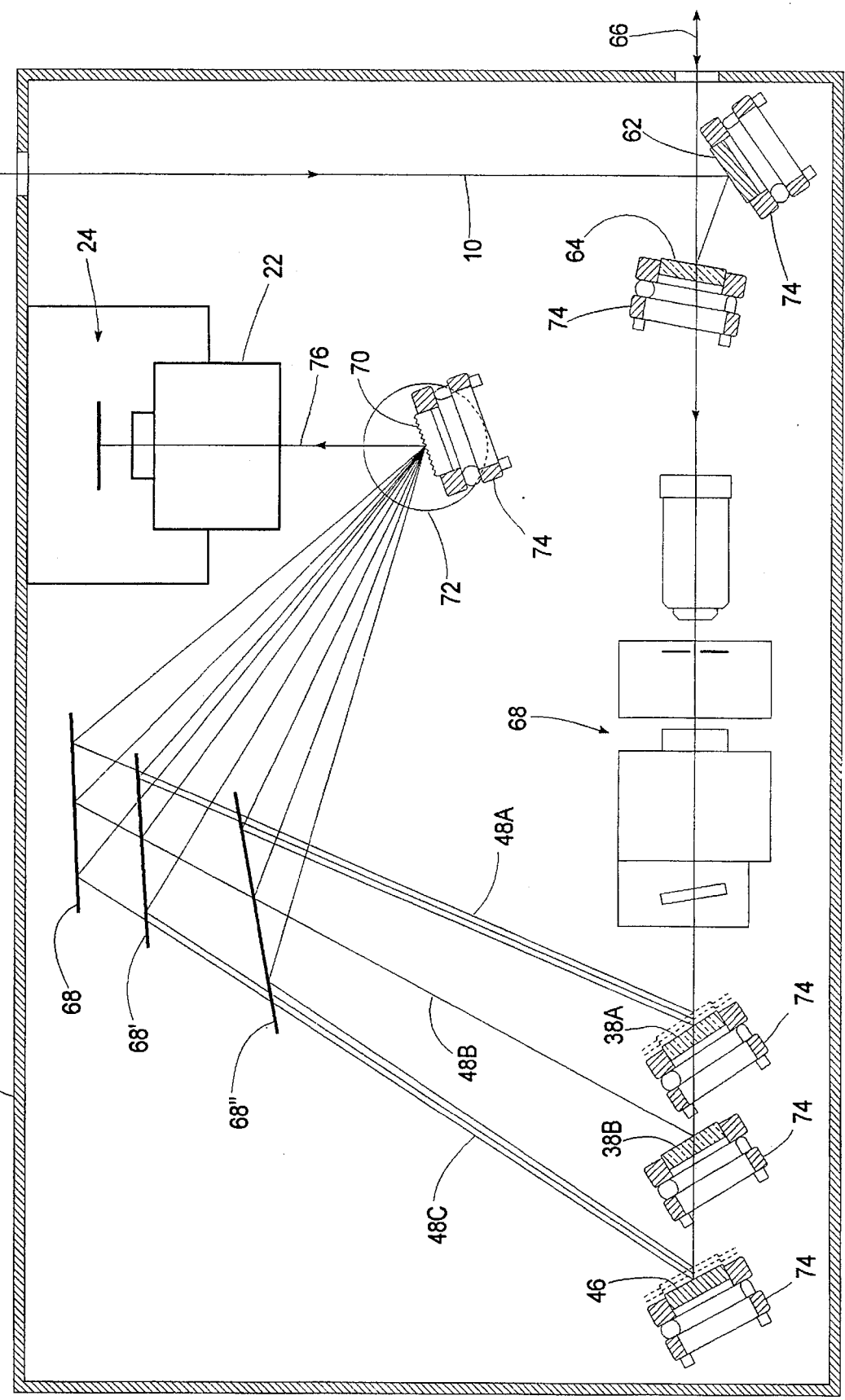
FIG. 6 is a plan view of one possible practical arrangement of the embodiment of FIGS. 4 and 5.

FIG. 6 shows a practical layout of a system in accordance with the principle shown in FIGS. 4 and 5. The various optical components shown in FIG. 6 are all contained within a housing 60. An incoming laser beam 10 (which may be generated by a laser external to the housing 60) is reflected by a mirror 62 onto a dichroic notch filter 64, e.g. a holographic notch filter. This filter 64 reflects light of the frequency of the incoming laser beam, but transmits all other frequencies. It thus reflects the incoming laser beam 10 along a path 66, outside the housing 60, through suitable optics (not shown) to illuminate a sample. Light scattered by the sample passes back along the path 66 and through the filter 64, which rejects the Rayleigh scattered light of the same frequency as the incoming laser beam 10. As described in EP 0543578, this filter is not normal to the optical path, but at a small oblique angle such as 10° or 11°. This small angle allows the laser beam to be injected into the optical path 66, while still enabling the instrument to discriminate Raman scattered light close to the Rayleigh line, and without significant problems if the light is polarised.

After the filter 64, the Raman scattered light passes through conventional components indicated generally at 68. These may optionally include an entrance slit and associated lenses, a polarising filter for investigating the polarisation state of the Raman scattered light, an additional notch filter for rejecting Rayleigh scattered light, etc.

Next, the Raman scattered light passes to edge filters 38A,38B and a mirror 46, which function as described in relation to FIGS. 4 and 5 to split the Raman scattered light into different spectral regions and reflect the three partial spectral regions to a beam folding mirror 68, and thence to a diffraction grating 70. This disperses the three beams 48A–48C, and three resulting partial spectra are focused by a lens 22 onto a CCD 24. As in FIGS. 4 and 5 the filters 38A,38B and mirror 46 are tilted at different angles out of the plane of FIG. 6 so that these three partial spectra are vertically displaced one above another on the CCD 24.

It is also important that the filters 38A,38B, mirror 46 and diffraction grating 70 should be adjusted to the correct positions and angles within the plane of FIG. 6 (i.e. tilted to the correct angles about axes normal to the plane of FIG. 6). These angles depend upon the desired angles of incidence of the three reflected beams upon the diffraction grating 70 and upon the resulting angles to which the desired three partial spectra will be dispersed by the diffraction grating so as to appear in the desired positions on the CCD 24. These angles can be calculated with reference to the wavelengths concerned, the pitch of the grating 70 etc.

A particular feature of the arrangement shown in FIG. 6 is that the design is readily adaptable for laser sources of different wavelengths. With the mirror in the position designated 68, the arrangement is suitable for a laser source with a wavelength 633nm. This can readily be adapted to accommodate laser sources with wavelengths of (for example) 780nm or 1064nm. The adaptation involves moving the mirror to the positions designated 68' and 68" respectively; replacing the grating 70 with one of a different pitch and tilting it to an appropriate angle within the horizontal plane of FIG. 6; choosing appropriate filters 38A,38B to suit the required wavelengths; and minor adjustments in the positions and angles of the filter 38A and mirror 46 (as indicated by broken lines and by the three alternative paths for the beams 48A and 48C). For a laser source of 1064nm, the silicon CCD 24 may not be sufficiently sensitive, so it could be replaced by (for example) a gallium arsenide 2D photodetector array.

The tilting of the grating 70 to the correct angle may be achieved by mounting it on a pivoting stage 72. This stage 72, of course, does not move in use and so does not need to be rotated to accurately indexed positions under automatic control. It can therefore be significantly cheaper than the precision rotary stage required in EP 0543578. The movement of the mirror 68 to the appropriate position may be achieved by the provision of alternative mounting fixtures at the three locations. The filters 38A,38B and 46 may be mounted on adjustable optical mounts 74, with screw adjustments for altering the position both translationally and by tilting about horizontal and vertical axes. Suitable adjustable mounts are available commercially from Photon Control Limited, Cambridge, United Kingdom or from Newport Corporation, Fountain Valley, Calif. U.S.A. Similar mounts may also be used for the mirror 62 and the holographic filter 64, and for mounting the diffraction grating 70 on the stage 72, although in these cases the full range of potential adjustment will not be required.

It will be appreciated that the beam folding mirror 68 is not essential. However, in the FIG. 6 arrangement, it produces two advantages. Firstly, it enables the various optical components to be fitted into a housing 60 of smaller size. Secondly, a simple change in the position of the mirror 68 accommodates a wide variety of included angles between the beams 48A–C and the centre line 76 of the spectra dispersed towards the CCD 24. As already mentioned, this wide variety of angles accommodates a wide variety of wavelengths for the laser source.

The arrangements shown in FIGS. 2–6 have used reflection gratings for the diffraction grating 44. A reflection grating can have advantages where the optical components are to be fitted into a housing of small size, since the reflection produces a folding of the light beam. However, it is also possible to use a transmission grating instead of the reflection grating. In the arrangements of FIGS. 4–6, a transmission grating can be placed nearer to the lens 22 than is possible with a reflection grating, since there is no need to ensure that the incoming beam to the grating does not clash with the lens. Since the grating can be closer to the lens, it is possible to use a smaller, cheaper lens or one with less aberrations.

Figure 7:
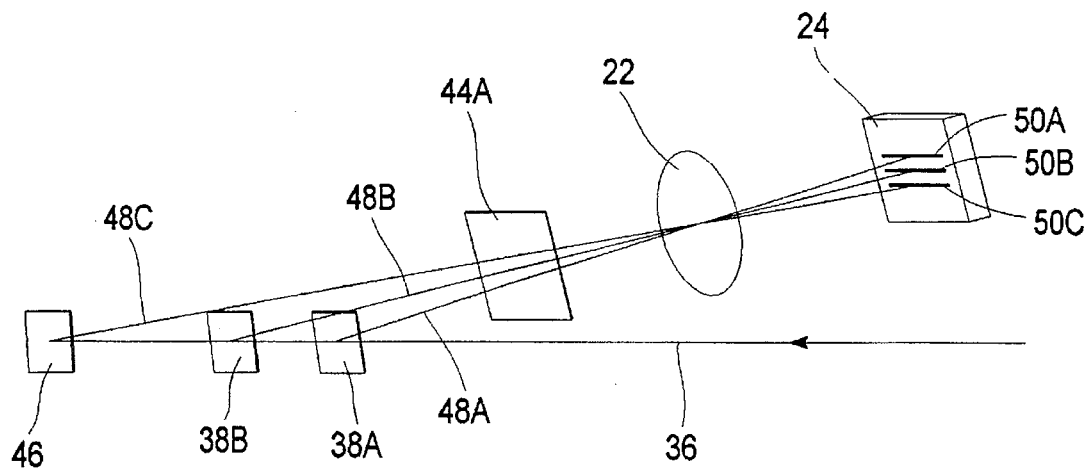
FIG. 7 is a side view of a modified arrangement of the embodiment of FIGS. 4 and 5.

FIG. 7 shows another embodiment. Here, the lens 22, CCD 24 and a transmission grating 44A lie generally in a plane which is tilted with respect to the incoming beam 36. As seen in FIG. 7, the line of these components is tilted both above the line of the incoming beam and out of the plane of the paper. Thus, if the filter 38B is arranged in line with the centre points of the grating 44A, lens 22 and CCD 24, it will be seen that the filter 38A lies below this tilted plane, whilst the mirror 46 lies above the tilted plane. As a result, with appropriate tilting of the filters 38A,38B and mirror 46, it is possible to arrange for the respective partial spectra 48A–C all to pass through the central region of the lens 22, producing their respective spectra 50A–C above each other on the CCD 24 as previously. It will be noted that this is an improvement over the arrangement of FIGS. 2–6, where each of the beams 48A–C passes through a different region of the lens 22. Once again, it is possible to use a lens 22 which is smaller and cheaper or which has less aberrations.

Comparing the arrangements of FIGS. 6 and 7, it can be seen that in FIG. 6 all the optical components lie in a single plane, although the filters 38A,38B and mirror 46 are tilted so as to direct some of the light beams out of that plane. In FIG. 7, in contrast, better use is made of the three available dimensions, since the various optical components are not all co-planar. Because the arrangement is not co-planar, however, it can be more difficult to manufacture. Having said that, the tilt angle required between the plane of the incoming beam 36 and the components 44A,22 and 24 may in some cases be quite small, e.g. only one or a few degrees. This tilt angle is somewhat exaggerated in FIG. 7. In practice, therefore, it may sometimes be possible to mount the components 44A,22 and 24 roughly in the same plane as the incoming beam 36, but tilted to an appropriate angle about a horizontal axis, and with the filters 38A,38B and mirror 46 directing the beams 48A–C through portions of the components 44A,22,24 which lie out of the plane.

Although FIG. 7 shows the use of a transmission grating 44A, it is equally possible to use a reflection grating, whilst still arranging this grating and the lens 22 and CCD 24 to lie in a plane which is tilted with respect to the incoming beam 36.

The examples in FIGS. 2–7 have shown the spectrum being split into three sections by the use of two filters and a mirror. However, it is of course possible to use just one filter in order to split the spectrum into two; or to use more filters to split the spectrum into four or even more parts. The actual cut-off frequencies for each filter will of course depend upon the particular application, including the width of the spectrum which it is desired to investigate, and the wavelength of the exciting light.

Figure 8:
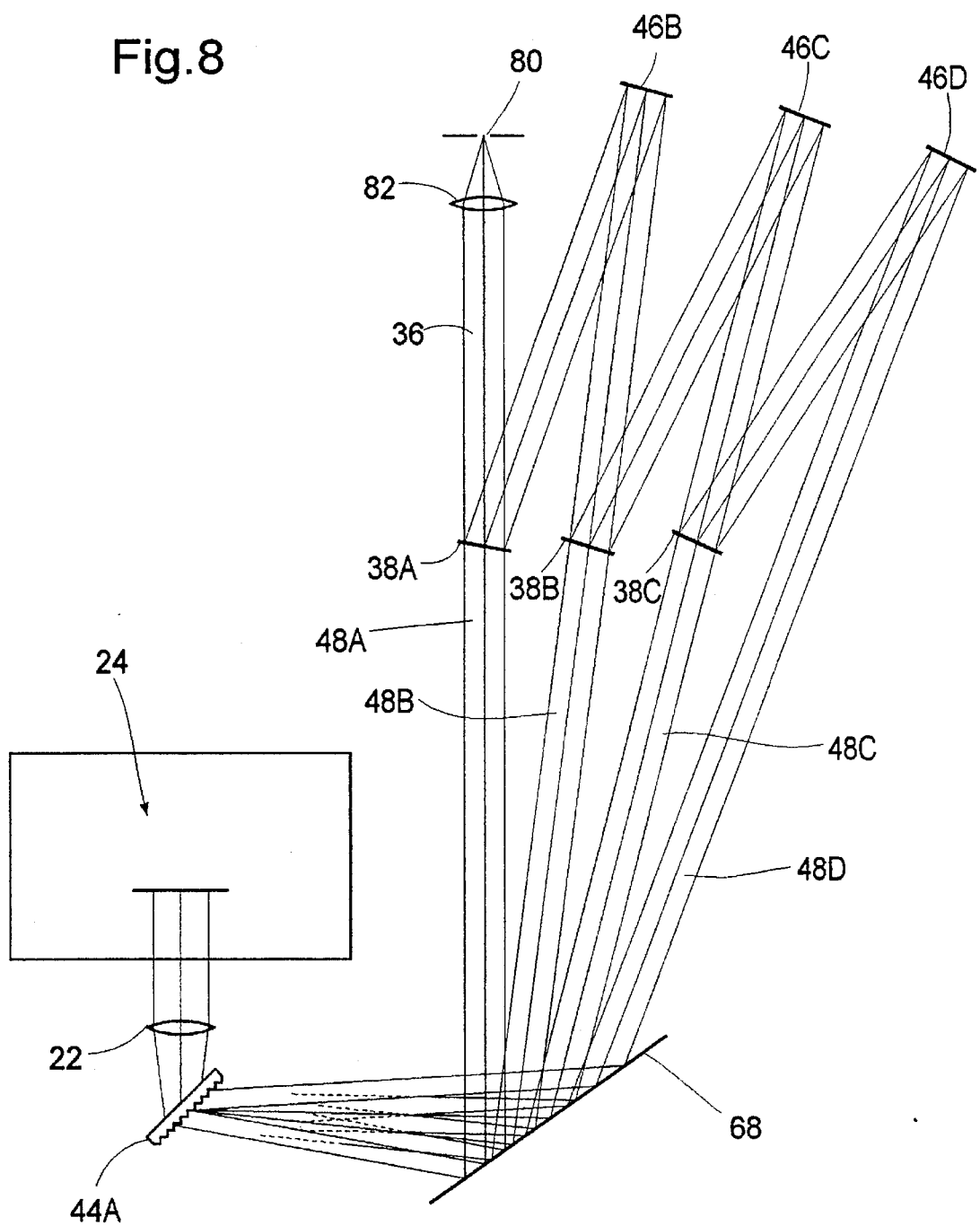
FIG. 8 is a schematic plan view of a third embodiment of Raman analysis apparatus according to the invention.

FIG. 8 shows a plan view of another apparatus. Raman scattered light from a sample passes through an entrance slit 80 and is collimated by a lens 82. The apparatus has four beam arms 48A,48B,48C,48D, covering different parts of the spectrum as previously. The first arm 48A comprises that part of the spectrum which is transmitted by an edge filter 38A. A beam folding mirror 68 reflects this beam arm 48A to a transmission diffraction grating 44A. This disperses the respective part of the spectrum, which is then focused by a lens 22 onto a CCD camera 24.

Figure 9:
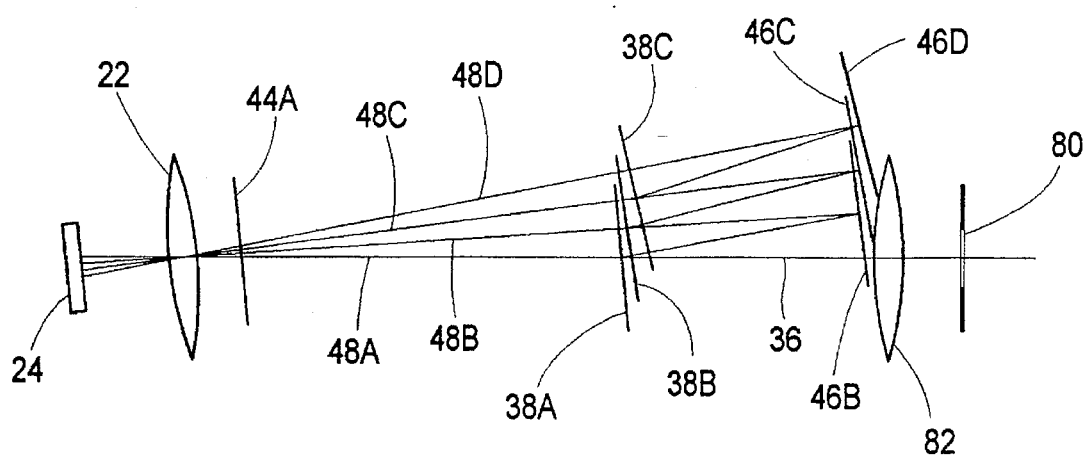
FIG. 9 is a schematic unfolded side view of the apparatus of FIG. 8.

The edge filter 38A reflects the rest of the spectrum towards a mirror 46B, which in turn reflects it towards an edge filter 38B. The edge filter 38B transmits the second beam arm 48B towards the beam folding mirror 68 and diffraction grating 44A, where again it is dispersed and the dispersed spectrum is focused by the lens 22 onto the CCD camera 24. In the same manner, the third beam arm 48C is produced by reflection from the edge filter 38B and from a mirror 46C towards an edge filter 38C, which transmits the light in the relevant part of the spectrum. Finally, the edge filter 38C reflects the part of the spectrum which makes up the fourth beam arm 48D towards a mirror 46D. As in FIG. 7, aberrations can be reduced and a cheaper lens used for the lens 22 if all the beam arms pass through the central portion of this lens. FIG. 9 is a schematic side view which shows how this is achieved, while still focusing the beam arms 48A–D vertically above each other on the CCD 24. For clarity, this side view has been shown unfolded, that is to say ignoring the beam folding mirror 68 and the angles of diffraction at the grating 44A. In addition to the horizontal angles of tilt of the edge filters 38A–C and mirrors 46B–D (i.e. the tilt about the vertical axis which can be seen in FIG. 8), these filters and mirrors are also tilted as shown in FIG. 9 in a vertical direction (i.e. about their horizontal axes). Thus, each of the arms 48B–D is tilted slightly in the vertical direction out of the plane of FIG. 8. After passing through the central region of the lens 22, therefore, the partial spectra formed from each of the arms 48A–D are spaced vertically one above the other on the CCD 24.

In the schematic view of FIG. 9, the grating 44A, lens 22 and CCD 24 are also shown with a slight vertical tilt, in order that they remain symmetrical about the beam arms 48A–48D, thereby reducing abberations and making the best possible use of the available detector area of the CCD 24. However, for ease of manufacture, it is desirable that these components should be in the same plane as the incoming beam 36. This is easily achieved by arranging the beam folding mirror 68 with a slight vertical tilt, thereby returning the grating 44A, lens 22 and CCD 24 to the required horizontal plane.

The vertical tilt angles have been somewhat exaggerated in FIG. 9. In practice, they are only of the order of one or a few degrees. The edge filters 38A–C and mirrors 46B–D are therefore only slightly out of the plane of the input beam 36, such that they are relatively easy to assemble in the required position on suitable adjustable mounts.

As seen in FIG. 8, the edge filters 38A–C each have a relatively low angle of incidence (about 10°) to the respective beam arm. Higher angles of incidence can be disadvantageous, since such filters can have transmission/reflection characteristics which are dependent on the polarisation state of the incident light. By keeping a low angle of incidence, such polarisation effects are minimised. The configuration shown, with angles of incidence of 10°, still enables the beam arms 48A–D to converge on the diffraction grating 44A at the requisite angles of incidence to ensure that their respective parts of the spectrum are all diffracted towards the CCD 24, as required. If the angles of incidence of the filters 38A–C were too small, this requirement would result in much greater lengths for the beam arms 48B–D, and in consequence it would not be possible to fit the apparatus into a relatively small housing.

As described above, the examples have used filters 38A, 38B, 38C which pass lower wavenumbers and reflect higher wavenumbers (i.e. which pass shorter wavelengths and reflect longer wavelengths). It is of course possible to use an inverse arrangement, with filters which pass higher wavenumbers and reflect lower wavenumbers. Of course, rather than using edge filters as described, it is possible to use bandpass filters, and these may have advantages in giving greater rejection of the Rayleigh scattered light.

For purposes of illustration, the various lenses illustrated have been singlet lenses. However, in practice, singlet, doublet or compound lenses may be used, e.g. doublets with or without a meniscus lens, to achieve the required performance with low abberations.

In a simple version, any of the described embodiments of the invention may use beam splitters in place of the filters 38A, 38B, 38C. However, the filters are preferred since at each pass through a beam splitter, 50% of the available light is lost. It can also be envisaged to use several separate diffraction gratings or other dispersive devices, each producing a respective one of the partial spectra in FIGS. 4–9.

In the embodiments of FIG. 2–7, it is also possible to replace the CCD 24 by three linear photodetector arrays, one for each of the partial spectra 50A–C. Similarly, in FIGS. 8–9, four linear photodetector arrays could be used. Another possibility is to use just one linear photodetector array, with each of the partial spectra 50A–C being focused on that single array (that is, no vertical tilting of the filters 38A–38B and mirror 46). Each partial spectrum is then viewed individually, by blocking each of the beams 48A–C with a suitable shutter, and opening each shutter individually. However, although such an arrangement reduces the cost of the detector, it obviously also removes the advantage of simultaneous viewing of all the partial spectra.

The arrangement shown in FIGS. 1 and 6, in which the incoming laser beam 10 is injected into the path 13 or 66 by the filter 12 or 64, is not essential. It is possible to illuminate the sample via an entirely separate optical path if desired. For example, the invention can be used with spectroscopic apparatus having a remote, hand-held probe head, laser light being delivered to the probe head via a first optical fibre, and Raman scattered light being brought back along the path 66 by another optical fibre.

Although all the above examples have discussed Raman spectroscopy, the invention can of course be used in many other types of spectroscopy, including fluorescence, infrared, narrow line photoluminescence, cathodoluminescence, etc.

We claim:

1. Spectroscopic analysis apparatus comprising:
   an optical input for receiving a spectrum of scattered light produced from a sample;
   a two-dimensional detector for the scattered light, extending in a first direction and in a second direction perpendicular to the first direction;
   a dispersive device arranged between the optical input and the detector to disperse a part of said spectrum across the detector in said first direction; and
   at least one filter arranged between the optical input and the detector, said filter transmitting a first part of the spectrum along a first optical path to the detector, and reflecting a second, different part of the spectrum along a second, different optical path to the detector; wherein the light in the first part of the spectrum reaching the detector by the first optical path is spaced in said second direction from light in the second part of the spectrum reaching the detector by the second optical path.

2. Apparatus according to claim 1 wherein there are at least two of said filters splitting the light into at least three different optical paths, and light in at least three parts of said spectrum reaches the detector via respective ones of said optical paths, at respective locations on said detector which are spaced apart in said second direction.

3. Apparatus according to claim 1, wherein the detector is a charge-coupled device.

4. Apparatus according to claim 1, wherein said filter is an edge filter.

5. Apparatus according to claim 1 wherein the filter or filters lies between the optical input and the dispersive device.

6. Apparatus according to claim 1 wherein the filter or filters lies between the dispersive device and the detector.

7. Apparatus according to claim 1 including a common lens for focusing the light in each of said optical paths onto the detector, each optical path passing through the centre of the lens.

8. Apparatus according to claim 1 wherein the dispersive device and the detector are generally co-planar with light received through the optical input.

9. Apparatus according to claim 1 wherein said spectrum which is detected is a spectrum of Raman scattered light.

10. A spectroscopic analysis apparatus comprising:
    an optical input for receiving a spectrum of scattered light produced from a sample;
    a detector for the scattered light, extending in at least a first direction;
    a dispersive device arranged between the optical input and the detector to disperse a part of said spectrum across the detector in said first direction;

at least one light splitter arranged between the optical input and the detector, to split the scattered light to follow at two different optical paths to the detector, the light reaching the detector by each of the optical paths being in different parts of said spectrum; and a common lens for focusing the light in each of said optical paths onto the detector, each optical path passing through the center of the lens.

11. Apparatus according to claim 10, wherein the detector is two-dimensional, extending in a second direction perpendicular to the first direction; and wherein the light in a first part of the spectrum reaching the detector by a first one of said optical paths is spaced in said second direction from light in a second part of the spectrum reaching the detector by a second one of said optical paths.

12. Apparatus according to claim 11, wherein there are at least three different optical paths and light in at least three parts of said spectrum reaches the detector via respective ones of said optical paths at respective locations on said detector which are spaced apart in said second direction.

13. Apparatus according to claim 10, wherein the light splitter is a filter which transmits one part of the spectrum along one optical path, and reflects another part of the spectrum along another optical path.

14. Apparatus according to claim 13, including a plurality of said filters for splitting the light into a plurality of said optical paths.

\* \* \* \* \*